United States Patent

[11] 3,545,791

[72] Inventor Max J. Lugash
    Los Angeles, California
[21] Appl. No. 805,781
[22] Filed March 10, 1969
[45] Patented Dec. 8, 1970
[73] Assignee Maxon Industries, Inc.
    Los Angeles, California

[54] COLLAPSIBLE TRAILER HITCH FOR TRUCK LOADERS
    7 Claims, 8 Drawing Figs.
[52] U.S. Cl. .................................................. 280/491, 214/77
[51] Int. Cl. ..................................................... B60d 1/06
[50] Field of Search .......................................... 280/491 (.5), 491; 214/77

[56] References Cited
    UNITED STATES PATENTS
2,837,227  6/1958  Lugash .................... 214/77(P)UX
2,954,569  10/1960  McCord et al. ............... 280/491(.5)UX
2,989,196  6/1961  Lugash ......................... 214/77(P)UX
3,055,023  9/1962  McCord et al. ............... 280/491(.5)UX
3,298,744  6/1967  Keim ............................ 298/17

Primary Examiner—Leo Friaglia
Attorney—Fulwider, Patton, Rieber, Lee & Utecht

ABSTRACT: A collapsible trailer hitch attachment for truck power loaders of the type in which a load platform is mounted on the swingable rear end of a lifting arm framework that, in turn, is pivotally connected at its forward end to a supporting frame, the lifting arm framework at opposite ends pivotally mounting a pair of oppositely swingable trailer hitch members which may alternatively be disposed generally within the plane of the lifting arm framework or projecting downwardly and rearwardly from the lifting arm framework, the members in lowered condition being coupled together and at the juncture of their coupled ends mounting a ball hitch to receive the ball socket of a trailer tow bar.

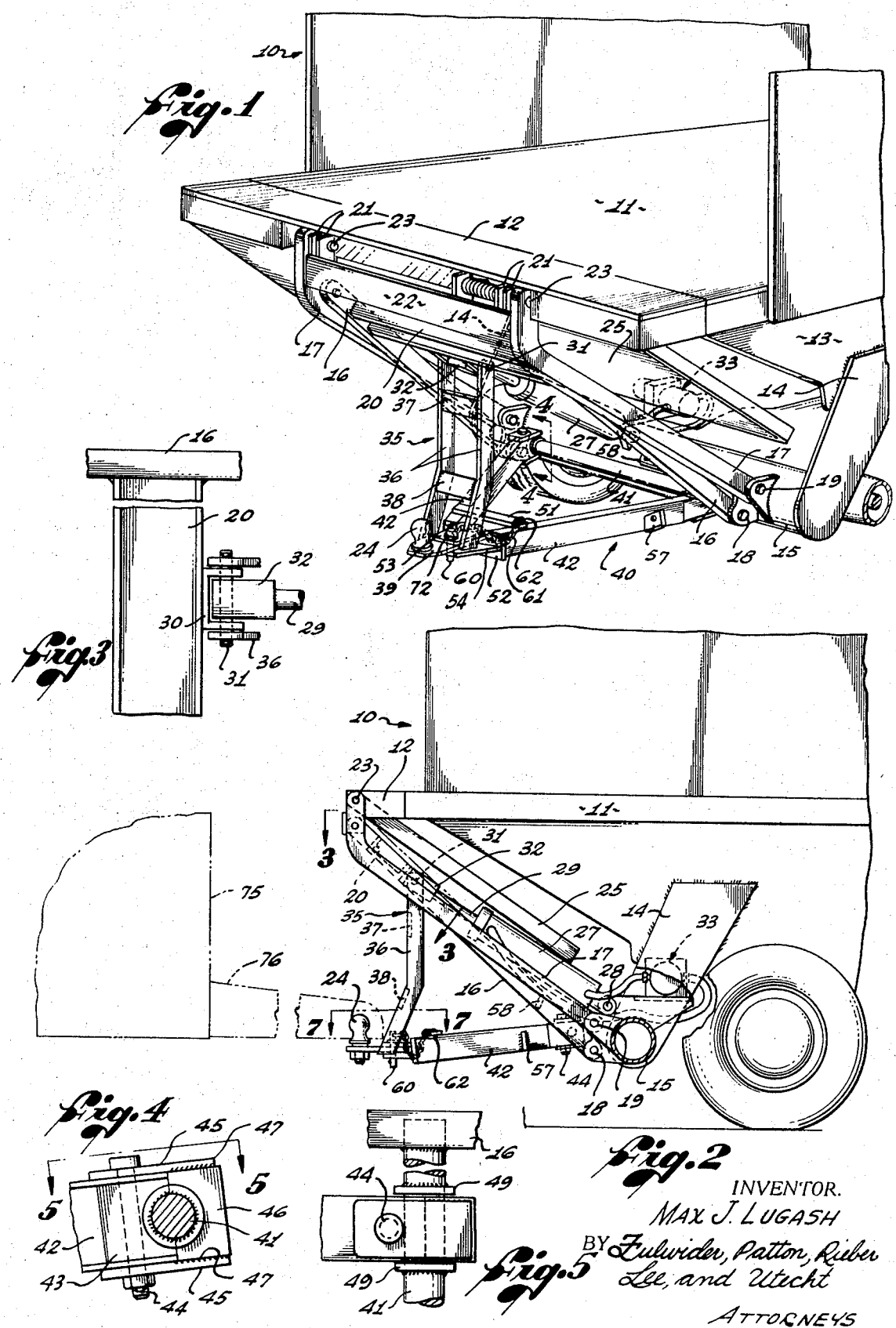

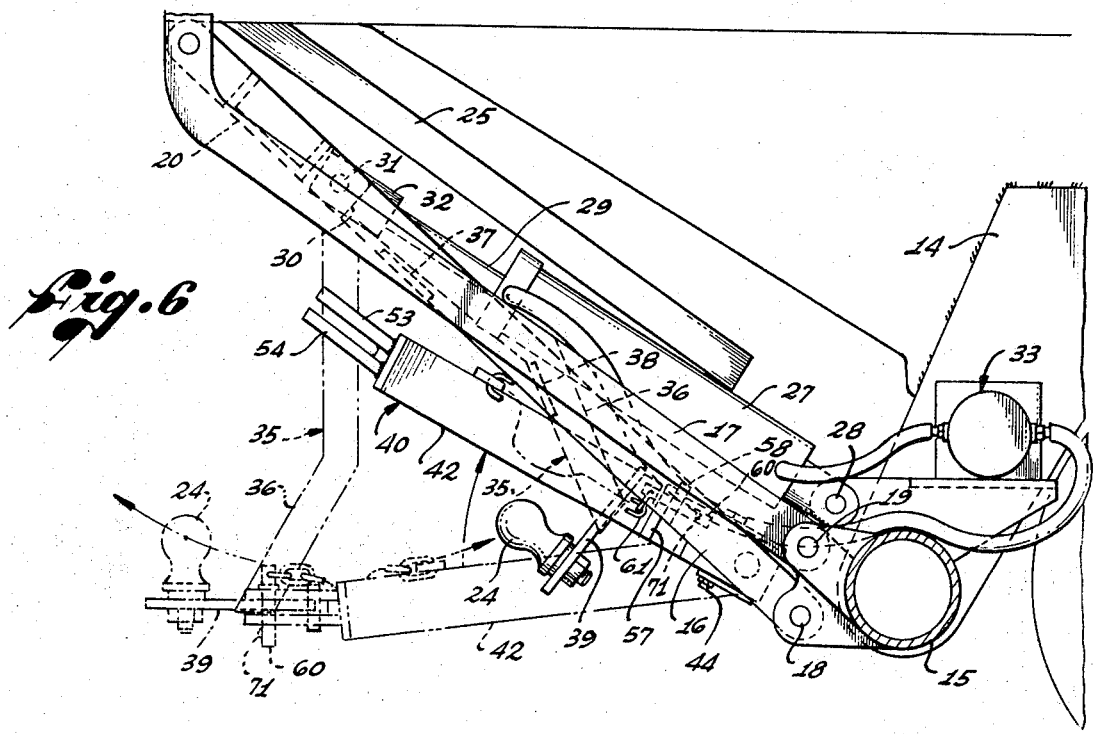
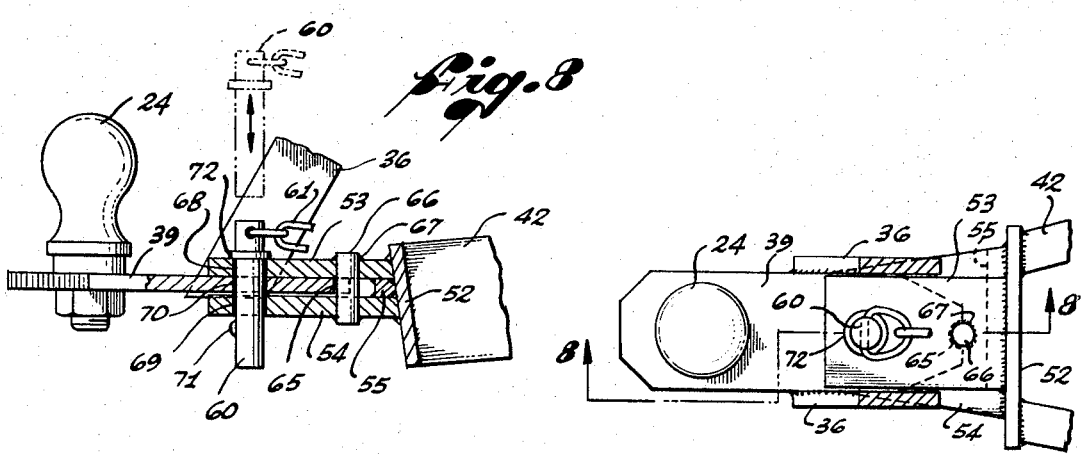

3,545,791

COLLAPSIBLE TRAILER HITCH FOR TRUCK LOADERS

BACKGROUND OF THE INVENTION

The present invention relates generally to trailer hitches for loader equipped trucks and, more particularly, to a collapsible trailer hitch attachment for platform loaders on the rear ends of trucks which may be stowed on the platform loader in a manner which will not interfere with the normal use of the loader and is quickly erectable into operative position to tow a trailer when the platform loader is inoperative condition.

BRIEF DESCRIPTION OF THE DRAWINGS

Fig. 1 is a perspective view of the rear end of a truck mounting a platform loader on which the collapsible trailer hitch attachment of the present invention is mounted, the hitch being shown in operative position.

FIG. 2 is a side elevational view of the apparatus shown in FIG. 1.

FIG. 3 is a partial plan view, on an enlarged scale, taken in the direction of the line 3–3 of FIG. 2.

FIG. 4 is a sectional view, on an enlarged scale, taken on the line 4–4 of FIG. 1.

Fig. 5 is a partial plan view taken on the line 5–5 of FIG. 4.

FIG. 6 is a view similar to FIG. 2, but on an enlarged scale, showing the stowed position of the collapsible hitch and also showing, in phantom outline, the extended operative position of the hitch.

FIG. 7 is a sectional view, on an enlarged scale, taken on the line 7–7 of FIG. 2.

FIG. 8 is a partial sectional view taken on the line 8–8 of FIG. 7.

DESCRIPTION OF THE PREFERRED EMBODIMENT

In FIG. 1, a truck 10 includes a bed 11 mounting a dock bumper extension 12 at the tailgate position. The chassis 13 of the truck mounts a tailgate loader which may be either of the tailgate-closing-type, in which the platform in operative position closes the tailgate of the truck, or of the invertable-platform type exemplified in my prior U.S. Pats. No. 2,837,227 and No. 2,989,196. The latter type of loader is depicted in the drawings and includes a pair of supporting brackets 14 affixed to opposite sides of the truck chassis 13 to depend downwardly therefrom to rigidly support a main frame member 15. This main frame has a spaced pair of lifting linkages connected thereto, each of the linkages comprising a lower arm 16 and an upper arm 17 pivotally connected at forward ends to the main frame 15, as is indicated at axes 18 and 19, respectively.

The lower arms 16, adjacent their rear ends, are rigidly interconnected by a channel shaped crossmember 20, thereby defining an essentially rigid lifting arm framework that is swingable about the axis of the pivot pins 18. At its rear end, each of the lower arms 16 is received and pivotally mounted between the lower ends of a pair of brackets 21, the two pairs of brackets being rigidly interconnected by a crossbar 22. The upper ends of the two pair of brackets 21 extend upwardly beyond the upper edge of the cross bar 22 for pivotal connection, as indicated at 23, to the rear ends of upper arms 17, the hinge pins defining the axis 23 also pivotally supporting a substantially rectangular platform 25 that is invertable over the lifting linkages.

The power means for raising and lowering the lifting linkages may be any of the conventional types but, preferably, comprises an electrohydraulic system, which includes a hydraulic cylinder 27 having its forward end pivotally interconnected at 28 to the main frame member 15. A piston rod 29 protrudes rearwardly from the hydraulic cylinder to be pivotally connected at its rear end to the channel brace 20. Thus, as is shown in FIG. 3, the channel brace 20 at its midpoint and along its forwardly disposed wall mounts a generally U-shaped bracket 30 the opposed walls of which seat a pivot pin 31 to pivotally mount a bearing block 32 rigidly affixed to the rear end of the piston rod 29. A power unit, conventionally comprising a motor and pump in operative association with a hydraulic reservoir and operatively interconnected via a hydraulic circuit with the hydraulic cylinder 27, is mounted on a convenient bracket connected to the main frame member 15. This apparatus is conventional in the art, examples thereof being illustrated in my above prior patents, and is, therefore, generally designated by the numeral 33. Suffice it to say that the power means upon opening of a suitable relief valve permits lowering of the lifting linkages and the apparatus carried thereon by the weight of the apparatus. For lifting of the linkage systems the electrical motor is energized to drive the pump to effect the introduction of pressure fluid to the rear end of the hydraulic cylinder 27, driving the piston therein forwardly to effect retraction of the piston rod with consequent elevation of the lifting arms.

Referring to FIGS. 2 and 6, and considering only the power loader elements and the space occupied thereby, it will be apparent that very little clearance is available for the mounting of a trailer hitch in this environment. In the case of the old tailgate loader, in which the load platform also constitutes the tailgate, and, therefore, does not have to be stowed under the bed of the truck above the linkages, the problem is not as severe. However, the collapsible trailer hitch attachment of my invention is usable with either type of loader and, in either event, does not interfere with the normal use of the loader for freight handling purposes and provides a quickly erectable trailer hitch that positions the ball joint or other trailer coupling connection sufficiently far to the rear so as to avoid short coupling such as would inhibit cornering with the trailer attached.

More particularly, in view of the space limitations presented by the loader attached to the truck 10, certain components of the loader are also utilized as components of the trailer hitch attachment. Thus, the essentially rigid framework defined by the lower linkage arms 16 and interconnections thereof at front and rear ends is utilized as a preferred base for mounting the components of the collapsible hitch, although other attachment points of the loader may be utilized. The elements of the hitch are collapsible to within the plane of this supporting framework, approximately, and upon being erected into operative position, defines a truss with this framework that is well adapted to stand the loads imposed by the trailer to be towed.

More specifically, a ladderlike ball hitch frame 35 is defined by a spaced pair of bars 36 that are rigidly interconnected by a spaced pair of straps 37 and 38. As indicated in FIG. 1, the bars 36 are held spaced apart by the straps 37 and 38 a distance no less than the outside diameter of the hydraulic cylinder 27 and the straps 37 and 38 are disposed along those edges of the bars 36 which face downwardly and forwardly. The upper or rear end of the ladder frame 35 is pivotally connected to the pivot pin 31 that also pivotally interconnects the rear end of the piston rod 29 to the channel brace 20. Thus, as indicated in FIG. 6, when the ladder frame 35 is swung forwardly and upwardly into its stowed position, the piston rod 29 has ample clearance between the ladder frame bars 36 and these bars also receive the rear end portion of the hydraulic cylinder 27 therebetween with clearance. The lower end portions of the ladder frame bars 36 are angularly related to the upper end portions and are closed and braced at their lower ends by a tongue 39 that has trailer coupling means, e.g., a ball hitch 40, rigidly secured thereto.

The trailer hitch also includes an A frame 40, including a convergent pair of channel members 42, that is pivotally mounted at a forward end to the forward ends of the lower linkage arms 16, by means of a heavy rod 41 having its opposite ends rigidly affixed in the confronting surfaces of the pair of lower arms 16. Referring to FIGS. 4 and 5, each channel 42 at its rear end, between its opposite walls, contains one-half of a bearing block 43 that is held in place by a fastener means 44 that also extends through an opposed pair of straps that embrace the walls of the channel 42 therebetween. These straps extend forwardly beyond the channel 42 and have a complementary half bearing block 46 rigidly secured therebetween, as by welding 47, the rod 41 thus pivotally supporting the channel arm. In order to prevent lateral displacement of the A frame 40 relative to its supporting rod 41, the rod adjacent each of its ends is provided with a spaced pair of washers 49 between which the bearing parts 43 and 46 are pivotally confined.

Adjacent the rear end of the A frame 40, and disposed on the upper walls of the two channels 42, the channels are rigidly connected by a crossing strap 51. At their rear extremity, the channels 42 are rigidly interconnected by a rearwardly facing bar 52 from which a spaced pair of plates 53 and 54 project rearwardly to define a tongue receiving slot. As is shown in FIG. 8, the plates 53 and 54 at their forward ends have a filler piece 55 sandwiched therebetween which, like the forward ends of the plates 53 and 54, is securely attached to the A frame plate 52 by means of welding.

In order to stow the trailer hitch, one of the A frame channels 42 is provided with a sidewardly projecting perforated tab 57 that is positioned for registration of the hole therein with the hole of another tab 58 secured to the confronting side of the adjacent one of the lower lifting arm 16. For storing the device, the ladder frame 35 is first fully raised to within the plane of the linkage arms 16, in embracing relationship to the hydraulic cylinder 27, in the manner previously described. The A frame 40 is then raised about its pivot axis defined by the rod 41 to bring the holes on the pair of tabs 57 and 58 into registration. Subsequently, a retainer pin 60 that is connected to one end of a chain 61 whose other end is secured, via a fastener 62, to any convenient portion of the apparatus, is inserted through the aligned holes to maintain the parts in the stowed position indicated in solid outline in FIG. 6. From this figure it will be observed that both the ladder frame 35 and A frame 40 lie generally or in major part within the plane of the lower arms 16, with the angled portions of the ladder frame 35 and the ball joint support plate or tongue 39 projecting downwardly between the channels 42 of the A frame, with ample road clearance. Further, from an inspection of FIG. 6, it will be observed that with the trailer hitch thus stowed, the power loader may be used for loading and unloading freight without interference from the stowed hitch, no part of which will contact the ground when the power loader is fully lowered.

When the lifting arms 16 are in the fully raised position, the hitch may be put into use by first removing the retainer pin 60 allowing the ladder frame 35 and A frame 40 to swing clear for subsequent interconnection of their free ends. As is shown in FIG. 8, the coupling of the two frames is accomplished by inserting the tongue plate 39 of the ladder frame 35 between the slot-defining plates 53 and 54 on the rear end of the A frame 40. The forward end of the tongue plate 39 is formed with a semicircular notch 65 which abuts and embraces the shank of a stud 66 that is rigidly secured by welding 67 to span the slot defined between the plates 53 and 54 in which the tongue plate 39 is closely received. Adjacent their rear ends the plates 53 and 54 are formed with coaxially related holes 68 and 69 that register with a hole 70 formed through the tongue plate 39 when the tongue plate has been indexed in position by the stud 66. Thereafter, the retainer pin 60 is inserted to hold the ladder frame 35 and A frame 40 in coupled position with the forward end of the tongue 39 indexed against the stud 66 and so braced against angular movement about the pin 60 in response to lateral forces on the ball 24. If desired, a spring loaded button 71 may be provided in the lower-end portion of the retainer pin 60 to prevent axial displacement of the pin 60 and a flange 72 may be provided on the upper-end portion of the retainer pin to limit insertion of the pin through the alogned holes.

With the hitch in operative position, a trailer 75 may now be connected for towing by the vehicle 10 by means of the conventional ball socket provided in the forward end of the trailer draw bar or tongue 76. It will be observed from FIG. 2 that the ball 24 is positioned by the A frame 40 and ladder frame 35 within the plane of the rearmost extremity of the truck whereby the trailer 75 is not unduly short coupled and the truck and trailer may be turned about corners of extremely short radius without interference therebetween.

While a presently preferred embodiment of the invention has been described by way of example, it is to be understood that the invention is not limited to the disclosed details of construction but only by the spirit and scope of the following claims.

I claim:

1. A collapsible trailer hitch for truck loaders comprising:
    a lifting arm frame adapted for mounting at the rear end of a truck;
    an opposed pair of hitch frame members, one of which is swingably mounted at a forward end thereof to a forward end of said frame, and the other of which is swingably mounted at a rear end thereof to a rear end of said frame;
    said pair of members being oppositely swingable towards one another for overlapping their swingable ends in a stowed position thereof in which both said members are disposed approximately within the plane of said frame;
    retainer means to releasably interconnect said frame and at least one of said members when said members are in the stowed position;
    cooperating means on the swingable ends of said pair of members for rigidly interconnecting said swingable ends when said pair of members are released from the stowed position to project downwardly from said frame whereby said frame and said pair of members define a rigid framework; and
    a trailer coupling means mounted on one of said members that is arranged to be positioned at the apex of said pair of members when said members are rigidly interconnected by said cooperating means.

2. A trailer hitch as in claim 1 in which:
    said cooperating means comprises a tongue affixed to the swingable end of said other member and a rigid means defining a slot that is rigidly affixed to the swingable end of said one member to matingly receive said tongue in a substantially horizontally disposed position when said ends of said pair of members are rigidly interconnected; and
    a fastener means is provided for detachably rigidly interconnecting said tongue and said slot defining means.

3. A trailer hitch as in claim 2 in which: said fastener means comprises a retainer pin and coaxially alignable holes formed through said tongue and said slot defining means adapted to receive said pin.

4. A trailer hitch as in claim 2 in which: said fastener means comprises a spaced pair of fastener means, one of which prevents withdrawal of said tongue from said slot-defining means and the other of which prevents relative angular movement of said tongue and slot-defining means about the axis of said one fastener means.

5. A trailer hitch as in claim 1 in which:
    said lifting arm frame includes a spaced pair of linkage arms and a cross brace interconnecting rear ends of said pair of arms;
    said one hitch frame member comprising an A frame having an apex defining said rear end of said one member;
    said other hitch frame member comprising a substantially rectangular framework having a transversely disposed tongue at said swingable end of said other member and comprising a portion of said cooperating means for rigidly interconnecting said swingable ends of said pair of members;
    said rectangular framework being adapted to be generally disposed within the plane of said linkage arms when in said stowed position with a forwardly disposed end over lying said rear end of said one member to be supported thereon;
    said retainer means comprising cooperating parts on said A frame and one of said linkage arms that are brought into registration with one another when said A frame is raised into said stowed position; and said tongue of said rectangular frame being receivable with clearance through said A frame in said stowed position.

6. A trailer hitch as in claim 5 in which:

said rear end of said A frame rigidly mounts a pair of superposed plates defining a slot therebetween that is adapted to receive a forward end of said tongue when said A frame and said rectangular frame are interconnected at their swingable ends; and said tongue and said spaced pair of plates being formed with coaxially alignable holes therethrough to receive a retainer pin therethrough.

7. A trailer hitch as in claim 6 in which:

said trailer coupling means is situated on a rear end of said tongue; and said tongue and said spaced pair of plates having cooperating portions at a position offset from said retainer pin holes adapted to prevent relative angular movement of said tongue and said pair of plates when a retainer pin is mounted in said holes.